United States Patent
Lee et al.

(10) Patent No.: US 8,669,498 B2
(45) Date of Patent: Mar. 11, 2014

(54) COOKER

(75) Inventors: Young Woo Lee, Seoul (KR); Yang Kyeong Kim, Seoul (KR); Yong Seog Jeon, Seoul (KR); Jae Kyung Yang, Seoul (KR)

(73) Assignee: LG Electronics, Seoul (KR)

( * ) Notice: Subject to any disclaimer, the term of this patent is extended or adjusted under 35 U.S.C. 154(b) by 1056 days.

(21) Appl. No.: 12/585,695

(22) Filed: Sep. 22, 2009

(65) Prior Publication Data

US 2010/0072188 A1  Mar. 25, 2010

(30) Foreign Application Priority Data

Sep. 23, 2008 (KR) .................. 10-2008-0093063

(51) Int. Cl.
*F27D 11/00* (2006.01)
*H05B 6/12* (2006.01)

(52) U.S. Cl.
USPC ........................ 219/440; 219/441; 219/620

(58) Field of Classification Search
USPC ............... 219/441, 620, 738, 440, 62, 62.12, 219/78.14
See application file for complete search history.

(56) References Cited

U.S. PATENT DOCUMENTS

| | | | | |
|---|---|---|---|---|
| 3,580,733 A | | 5/1971 | Ott | |
| 3,986,891 A | * | 10/1976 | Rumbaugh | 134/58 D |
| 5,097,759 A | * | 3/1992 | Vilgrain et al. | 99/483 |
| 5,512,734 A | * | 4/1996 | Copstead | 219/679 |
| 5,898,180 A | | 4/1999 | Venkataramani et al. | |
| 6,218,650 B1 | * | 4/2001 | Tsukamoto et al. | 219/681 |
| 6,511,931 B1 | | 1/2003 | Baldwin | |
| 6,896,934 B2 | | 5/2005 | Aronica et al. | |
| 7,005,396 B2 | | 2/2006 | Espargilliere et al. | |
| 7,166,824 B2 | * | 1/2007 | Kanzaki et al. | 219/682 |
| 7,241,977 B2 | * | 7/2007 | Friedl et al. | 219/411 |
| 7,358,462 B2 | * | 4/2008 | Timans | 219/390 |
| 7,915,568 B2 | * | 3/2011 | Wang | 219/680 |
| 2003/0064874 A1 | | 4/2003 | Jean-Christophe et al. | |
| 2003/0159721 A1 | | 8/2003 | Stephan | |
| 2004/0040954 A1 | * | 3/2004 | Kim | 219/681 |
| 2004/0094542 A1 | * | 5/2004 | Kim et al. | 219/682 |
| 2005/0056634 A1 | * | 3/2005 | Shozo | 219/401 |
| 2006/0191913 A1 | * | 8/2006 | Park | 219/679 |
| 2006/0278630 A1 | * | 12/2006 | Sung et al. | 219/401 |
| 2007/0044789 A1 | | 3/2007 | Grieco | |
| 2008/0135538 A1 | * | 6/2008 | Polley | 219/391 |
| 2008/0223357 A1 | | 9/2008 | Bartelick et al. | |
| 2009/0208621 A1 | * | 8/2009 | Dotan | 426/389 |
| 2009/0311514 A1 | * | 12/2009 | Shon et al. | 428/325 |
| 2009/0325782 A1 | * | 12/2009 | Venkataramani et al. | 502/2 |

FOREIGN PATENT DOCUMENTS

| | | |
|---|---|---|
| CN | 101018435 | 8/2007 |
| JP | 60-75335 A | 4/1985 |
| KR | 20-0242833 | 10/2001 |
| KR | 10-2008-0032708 | 4/2008 |

* cited by examiner

*Primary Examiner* — James Mitchell
(74) *Attorney, Agent, or Firm* — McKenna Long & Aldridge, LLP

(57) ABSTRACT

An enamel coating including a phosphate-based ingredient is provided on an inner surface of a cooking chamber and the inner surface of the cooking chamber is cleaned using high-temperature cleaning water. Therefore, the cleaning of the cooking chamber can be performed more efficiently.

10 Claims, 9 Drawing Sheets

COOKER

CROSS REFERENCES RELATED APPLICATIONS

The present application claims priority under 35 U.S.C. 118B and 35 U.S.C. 365 to Korean Patent Application No. 10-2008-0093063(filed on Sep. 23, 2008), which is hereby incorporated by reference in its entirety.

BACKGROUND

1. Field of the Disclosure

The present disclosure pertains to a cooker, and more particularly, to a cooker of which a cooking chamber can be easily cleaned.

2. Description of the related art

A cooker is a home appliance that cooks food using electricity or gas. The cooker generally includes a cooking chamber where food is received and cooked. The food received in the cooking chamber is heated and cooked by a heating source provided in the cooker.

SUMMARY

A cooker whose cooking chamber can be more easily cleaned than a conventional cooker is highly desirable.

In one embodiment, a cooker includes a cavity that includes a cooking chamber. A door selectively opens and closes the cooking chamber and a heating source is provided for providing heat to cook food inside the cooking chamber. An enamel coating layer is positioned on an inner surface of the cooking chamber and includes a phosphate-based ingredient.

In other embodiment, a cooker includes a cavity that includes a cooking chamber. A door selectively opens and closes the cooking chamber and a heating source provides heat for cooking food inside the cooking chamber. An enamel coating layer is positioned on an inner surface of the cooking chamber and includes a phosphorus pentoxide ($P_2O_5$) ingredient. Further, a cleaning apparatus supplies cleaning water to the inside of the cooking chamber and a control unit controls operations of the heating sources and the cleaning apparatus.

In another embodiment, a cooker includes a cavity that includes a cooking chamber. A door selectively opens and closes the cooking chamber. A heating source provides heat for cooking food inside the cooking chamber. An enamel coating layer is positioned on an inner surface of the cooking chamber and includes a phosphorus pentoxide ($P_2O_5$) ingredient. A steam generating apparatus generating steam supplied to the inside of the cooking chamber and a control unit controls operations of the heating source and the steam generating apparatus.

BRIEF DESCRIPTION OF THE DRAWINGS

Various features and advantages of the present invention will become apparent from the following description of preferred embodiments given in conjunction with the accompanying drawings, in which.

THE DETAILED DESCRIPTION

A first embodiment of a cooker according to the present invention will be described in more detail with reference to the accompanying drawings.

Figure 1:
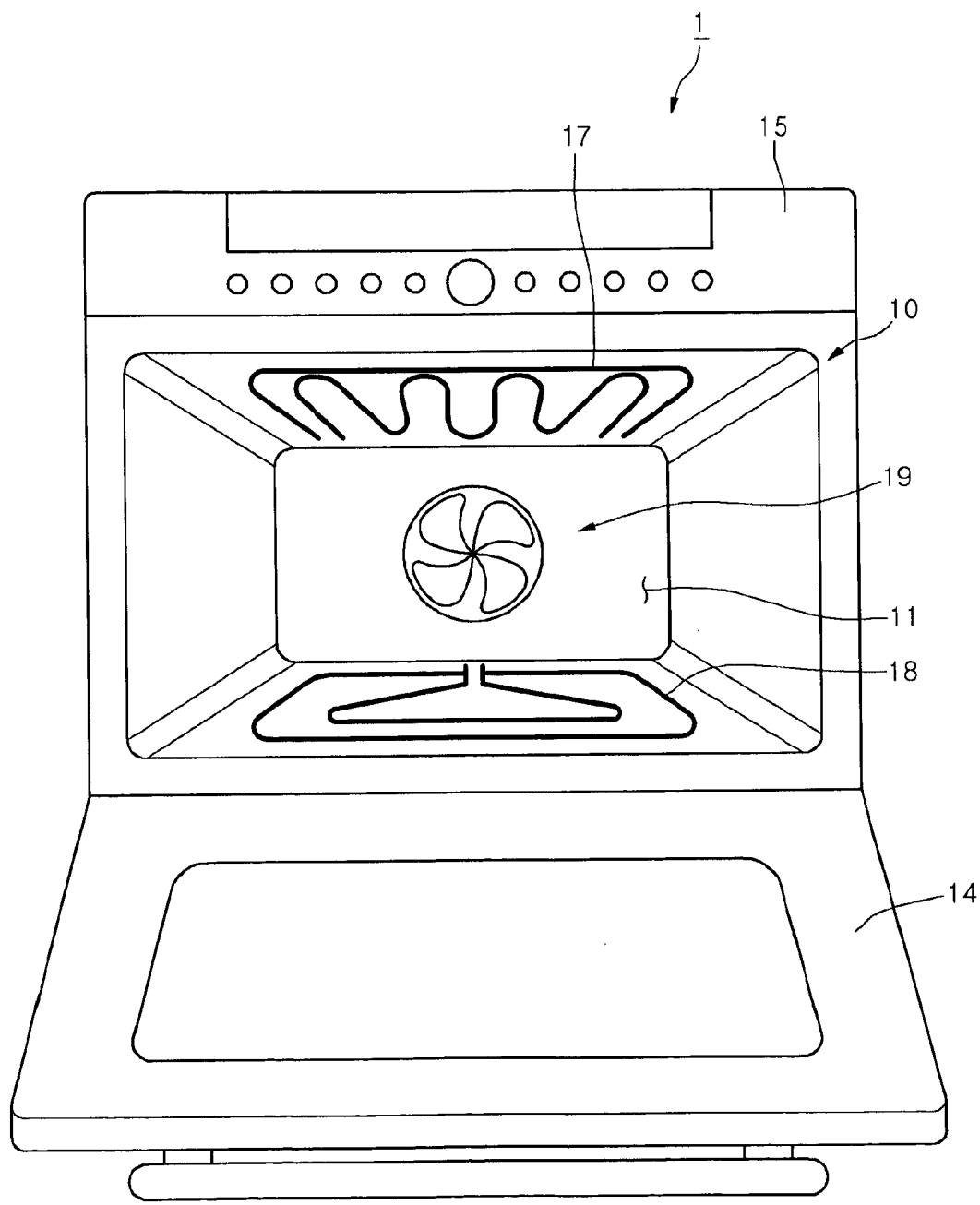
FIG. 1 is a perspective view showing a first embodiment of a cooker according to the present invention.
Figure 2:
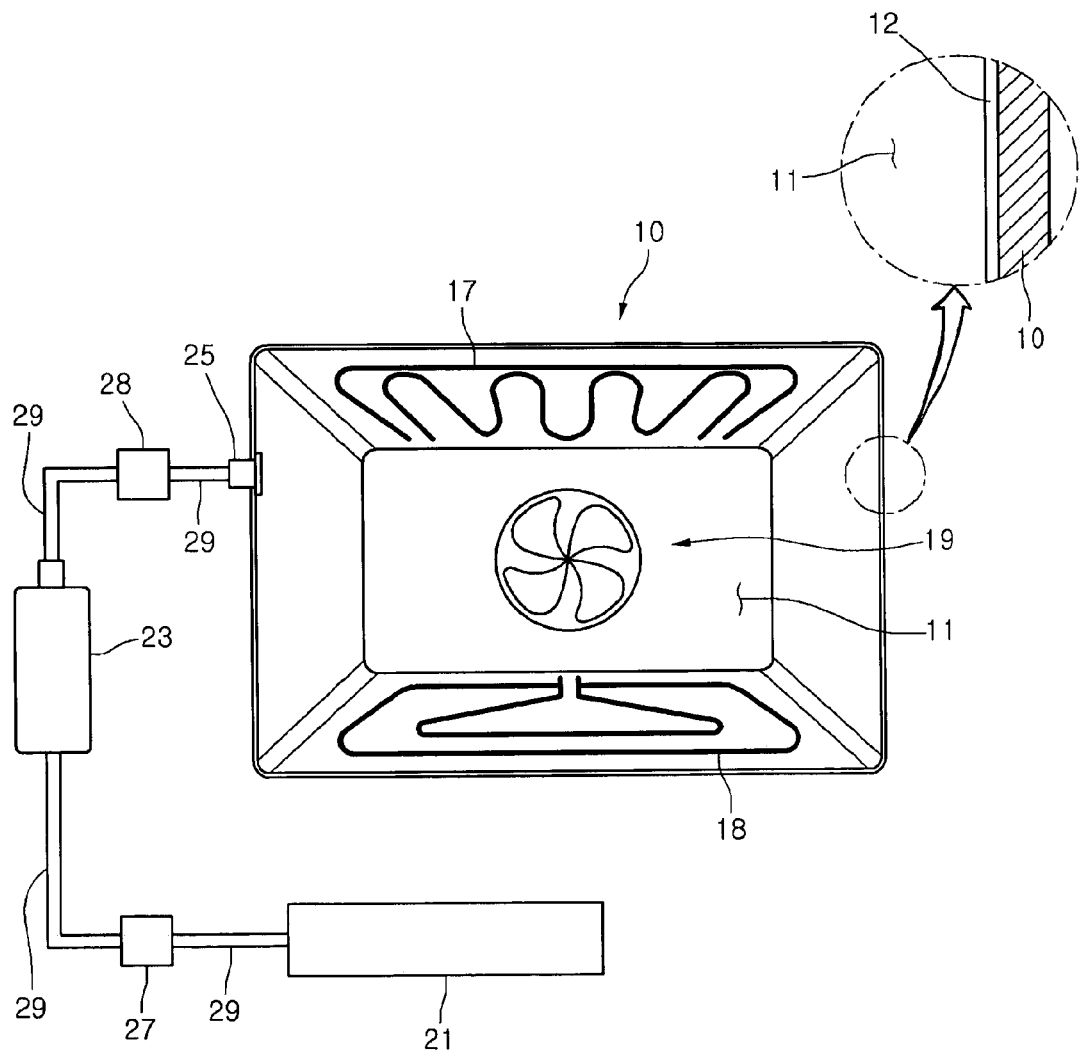
FIG. 2 is a schematic diagram of the first embodiment according to the present invention.

FIG. 1 is a perspective view showing a first embodiment of a cooker according to the present invention, and FIG. 2 is a schematic diagram of the first embodiment according to the present invention.

Referring to FIGS. 1 and 2, a cooking chamber 11 is provided inside a cavity 10 of the cooker 1. The cooking chamber 11 is where food is cooked. The cooking chamber 11 may be formed in a hexahedral configuration of which a front face is opened by way of a door 14, for example.

The cooking chamber 11 is selective opened and closed by the door 14 by pulling or pushing the door 14 about a rotational axis centered at a lower end on the cooker 1.

A controller 15 is provided on a front upper end of the cavity 10 corresponding to the upper portion of the cooker 1. The controller 15 is configured to include an input unit that receives operation signals for operating the cooker, an output unit that outputs information on the operation of the cooker, and a control unit that controls the operation of the cooker. Herein, the control unit, in particular, controls operations of a heating source and/or a cleaning apparatus to be described later.

One or more heating sources are provided in the cavity 10. The heating sources provide heat for cooking food inside the cooking chamber 11 of the cooker 1. In the present embodiment, an upper heater 17 and a lower heater 18 are installed at the upper and lower portions of the cooking chamber 11. The upper heater 17 and the lower heater 18 provide radiant heat within the cooking chamber 11. In this embodiment, a convection apparatus 19 is installed at a rear surface of the cooking chamber 11. The convection apparatus 19 is configured to include a convection heater (not shown) and a convection fan (not shown), and provides radiant heat within the cooking chamber 11 as air heated by the convection heater is circulated inside the cooking chamber 11 by the convection fan. In alternative embodiments, a separate fan that blows air heated by any one of the upper heater 17 and the lower heater 18 within the cooking chamber 11 may also be provided, or a separate opening part that radiates heat of the convection heater to the inside of the cooking chamber 11 may also be formed at the rear surface of the cooking chamber 11.

Referring to an enlarged portion of FIG. 2, an enamel coating layer 12 is provided on the inside of the cooking chamber 11. The enamel coating layer 12 may contain a phosphate-based ingredient, for example, phosphorus pentoxide ($P_2O_5$). The phosphate-based ingredient including the phosphorus pentoxide improves corrosion resistance, anti-rust, high-temperature oxidation resistance, etc., of the enamel coating layer 12. Therefore, during the process of cooking food, food residuals stuck to an inner surface of the cooking chamber 11 that uses enamel coating layer 12 is easily removed. For example, the enamel coating layer 12 may contain phosphorus pentoxide of 30% or less, preferably, phosphorus pentoxide of 20% or less.

A cleaning apparatus that supplies high-temperature cleaning water to the inside of the cooking chamber 11 is provided at one side of the cavity 10. The high-temperature cleaning water is supplied to the inside of the cooking chamber 11 and is used to remove food residuals stuck to the inner surface of the cooking chamber 11. The cleaning apparatus is configured to include a water tank 21, a heating unit 23, a supplying unit 25, pumps 27 and 28, and pipes 29.

Cleaning water is stored in the water tank 21. The water tank 21 may be detachably installed to easily replenish the cleaning water when depleted. In alternative embodiments, the water tank 21 may receive cleaning water directly from an external water source or may receive cleaning water from a separate container containing the cleaning water.

The heating unit 23 serves to generate high-temperature cleaning water by receiving and heating the cleaning water from the water tank 21. For example, a general boiler may be used as the heating unit 23.

The supplying unit 25 serves to supply the high-temperature cleaning water heated by the heating unit 23 to the inside of the cooking chamber 11. To this end, the supplying unit 25 is installed at one side of the cooking chamber 11 or is projected into the inside of the cooking chamber 11, making it possible to supply the high-temperature cleaning water to the inside of the cooking chamber 11.

In this embodiment, two pumps, first and second pumps 27 and 28, are used. The first pump 27 transfers the cleaning water stored in the water tank 21 to the heating unit 23. The second pump 28 serves to transfer and supply the high-temperature cleaning water heated by the heating unit 23 to the supplying unit 25. However, it is not necessary to have the pumps configured as first and second pumps 27 and 28. In an alternative embodiment, only one of the pumps 27 and 28 may be used to provide water flow through the pipes 29. In another alternative embodiment, the heating unit 23 may be positioned inside the water tank 21 together with one or more pumps.

The pipes 29 connect the water tank 21 to the heating unit 23, and connects the heating unit 23 to the supplying unit 25. Generally, relatively low-temperature cleaning water flows through the pipes 29 connecting the water tank 21 to the heating unit 23 and relatively high-temperature cleaning water flows through the pipes 29 connecting the heating unit 23 and the supplying unit 25.

Hereinafter, operations of the first embodiment of the cooker according to the present invention will be described in more detail.

First, food is cooked inside the cooking chamber 11. If the cooking of food is completed inside the cooking chamber 11, the food is taken out of the cooking chamber 11.

Meanwhile, food residuals leftover during cooking, for example, oil, etc., may be stuck to the inner surface of the cooking chamber 11. Therefore, the control unit operates the cleaning apparatus in order to remove such food residuals.

More specifically, when the first pump 27 is driven, the cleaning water stored in the water tank 21 is transferred to the heating unit 23 through the pipes 29. The cleaning water transferred to the heating unit 23 is heated by the heating unit 23, thereby generating high-temperature cleaning water.

The high-temperature cleaning water is transferred to the supplying unit 25 by the second pump 28 where the high-temperature cleaning water is supplied to the inside of the cooking chamber 11 through the supplying unit 25. The high-temperature cleaning water washes the food residuals off from the inner surface of the cooking chamber 11 or softens the food residuals which can be easily wiped off, thereby performing the cleaning of the cooking chamber 11.

Enamel coating layer 12 including phosphorus pentoxide that is a phosphate-based ingredient is provided on an inner wall of the cooking chamber 11. Therefore, food residuals stuck to the inner wall of the cooking chamber 11 can be easily removed by the high-temperature cleaning water supplied to the inside of the cooking chamber 11.

Hereinafter, a second embodiment of the cooker according to the present invention will be described in more detail with reference to the accompanying drawings.

Figure 3:
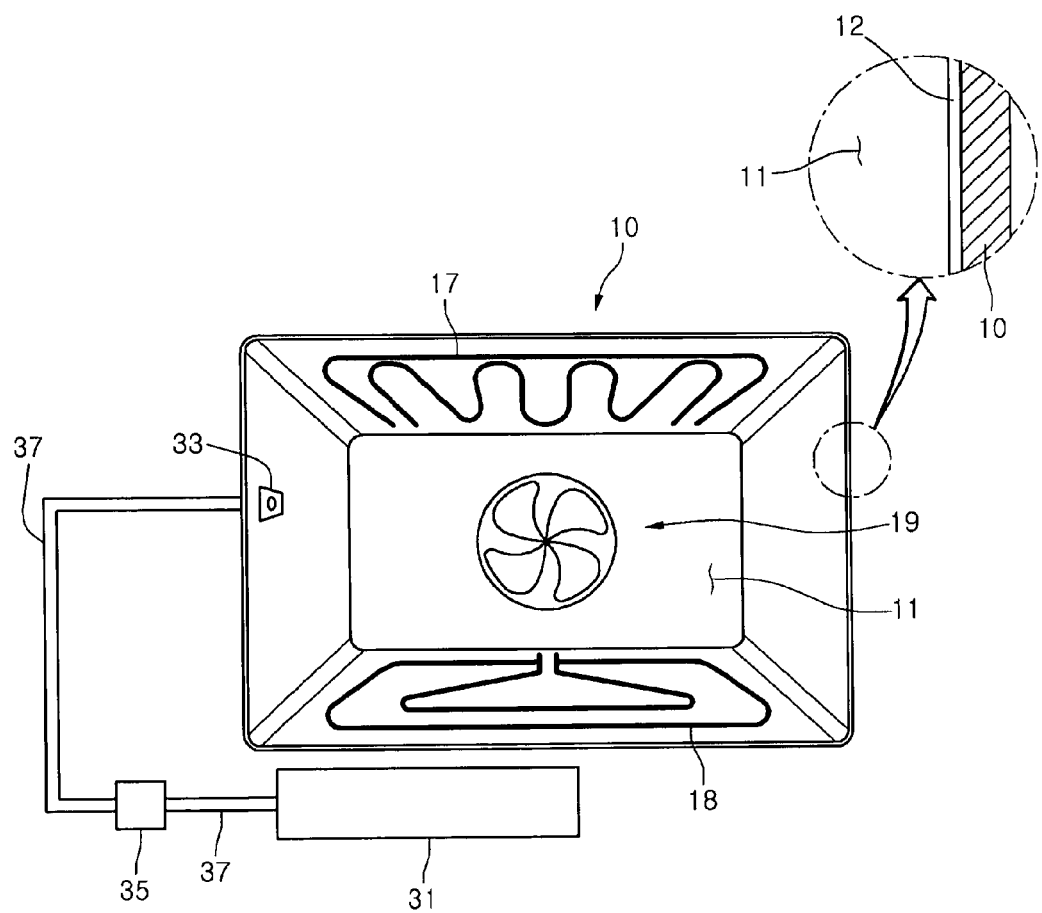
FIG. 3 is a schematic diagram of a second embodiment of the cooker according to the present invention.

FIG. 3 is a schematic diagram of a second embodiment of the cooker according to the present invention. The elements in the present embodiment that are the same or similar as those in the first embodiment will be described using the same reference numerals in FIGS. 1 and 2, and the detailed description thereof will be omitted.

Referring to FIG. 3, a cooking chamber 11 where food is cooked is provided inside a cavity 10. Referring to an enlarged portion of FIG. 3, an enamel coating layer 12 is also provided on an inner surface of the cooking chamber 11 in the present embodiment, in the same or similar manner as the first embodiment.

In the present embodiment, cleaning water is supplied to the inside of the cooking chamber 11 in order to clean the cooking chamber 11, and the cleaning water supplied to the inside of the cooking chamber 11 is heated by at least any one of heating sources that can provide heat for cooking food inside the cooking chamber 11.

Therefore, according to the present embodiment, a separate heating source that heats the cleaning water, for example, a boiler, may be omitted. More specifically, a cleaning apparatus is configured to include a water tank 31, a supplying unit 33, a pump 35, and pipes 37.

The cleaning water is stored in the water tank 31. The supplying unit 33 supplies the cleaning water stored in the water tank 31 to the inside of the cooking chamber 11. The pump 35 serves to transfer the cleaning water stored in the water tank 31 to the inside of the cooking chamber 11. The pipes 37 connect the water tank 31 to the supplying unit 33.

If the cleaning water is supplied to the inside of the cooking chamber 11, a control unit (not shown) controls at least one of the heating sources to operate during a predetermined time. If the operation of the heating sources is finished or the predetermined tempering time elapses after the operation of the heating sources is finished, an output unit outputs a signal reporting thereof.

Hereinafter, operations of the second embodiment of the cooker according to the present invention will be described in more detail.

First, the control unit operates the cleaning apparatus in order to remove food residuals stuck to an inner surface of the cooking chamber 11. If the cleaning apparatus is operated, the pump 35 is driven. Therefore, the cleaning water stored in the water tank 31 flows through the pipes 37 driven by the pump 35, thereby being supplied to the inside of the cooking chamber 11 through the supplying unit 33.

If the cleaning water is supplied to the inside of the cooking chamber 11, the control unit controls the heating sources, that is, at least one heating source which could be an upper heater 17, a lower heater 18, and a convection apparatus 19, to operate during a predetermined operation time. Therefore, the cleaning water supplied to the inside of the cooking chamber 11 is heated by the operated heating source.

Meanwhile, if the operation time of the heating source elapses, that is, the operation of the heating source is terminated, a signal reporting thereof is outputted. If the operation of the heating source is terminated or the predetermined tempering time elapses after the operation of the heat source is terminated, the output unit outputs a signal reporting thereof.

The signal reports to a user the termination of the heat source operation and/or the lapse of the tempering time that tempers with the food residuals stuck to the inner surface of the cooking chamber 11. If the tempering time elapses, the user can wipe clean the inner surface of the cooking chamber 11, thereby completing the cleaning of the cooking chamber 11.

Hereinafter, a third embodiment of the cooker according to the present invention will be described in more detail.

Figure 4:
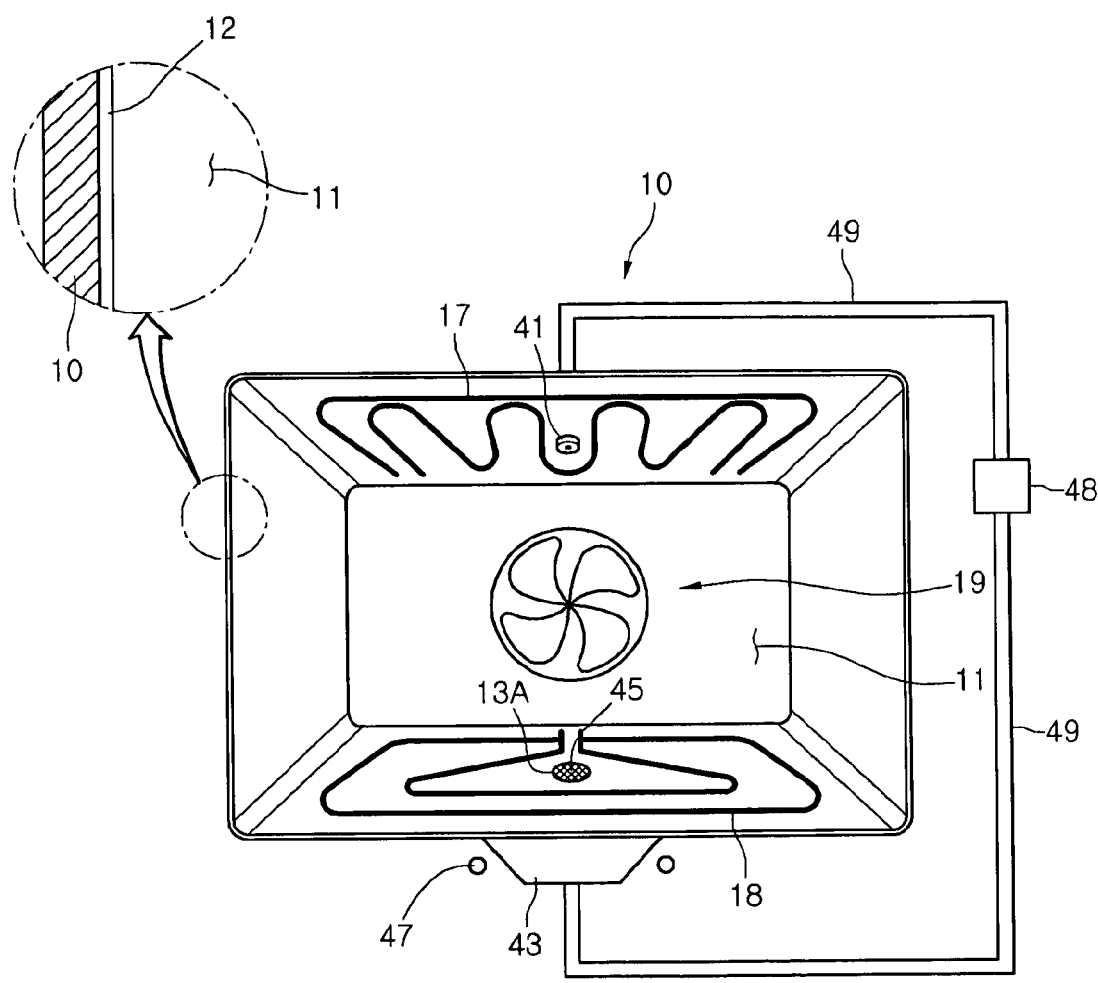
FIG. 4 is a schematic diagram of a third embodiment of the cooker according to the present invention.
Figure 5:
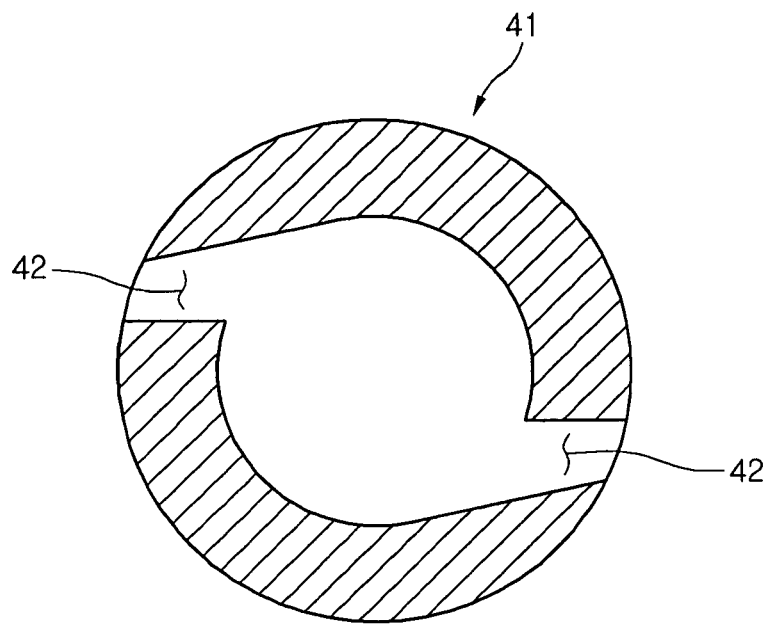
FIG. 5 is a vertical cross-sectional view of a high-temperature cleaning water supplying unit shown in the third embodiment.

FIG. 4 is a schematic diagram of a third embodiment of the cooker according to the present invention, and FIG. 5 is a vertical cross-sectional view of a high-temperature cleaning water supplying unit 41 of the third embodiment. The elements of the present embodiment that are the same or similar as those in the first embodiment will be described using the same reference numerals in FIGS. 1 and 2, and the detailed description thereof will be omitted.

Referring to FIG. 4, a cooking chamber 11 where food is cooked is provided inside a cavity 10. Referring to an enlarged portion of FIG. 4, an enamel coating layer 12 including a phosphate-based ingredient of 30% or less, preferably, a phosphate-based ingredient of 20% or less, for example, phosphorus pentoxide, is provided on an inner surface of the cooking chamber 11, in the same or similar manner as the first embodiment.

A water gathering hole 13A is formed at a bottom surface of the cooking chamber 11. The water gathering hole 13A is a place where the cleaning water supplied to the inside of the cooking chamber 11 gathers to drain through a sump to be described later. The water gathering hole 13A may be formed by cutting a portion of the bottom surface of the cooking chamber 11. In the present embodiment, the water gathering hole 13A is positioned at a region that does not overlap with a lower heater 18.

Meanwhile, a cleaning apparatus that cleans food residuals stuck to an inner surface of the cooking chamber 11 is provided at one side of the cavity 10. More specifically, the cleaning apparatus is configured to include a supplying unit 41, a sump 43, a filtering unit 45, a heating source 47, a pump 48, and pipes 49.

The supplying unit 41 may project into the inside of the cooking chamber 11. The supplying unit 41 serves to supply high-temperature cleaning water to the inside of the cooking chamber 11. In the present embodiment, the supplying unit 41 is positioned at a central portion of a ceiling surface of the cooking chamber 11. However, the position of the supplying unit 41 is not limited thereto.

Referring to FIG. 5, the supplying unit 41 is installed rotatably at one end of the pipe 49. In the present embodiment, the supplying unit 41 is exposed to the inside of the cooking chamber 11, penetrating through the central portion of the ceiling surface of the cooking chamber 11. The supplying unit 41 is formed in a hollow cylindrical configuration in which a lower surface is shielded to be installed at one end of the pipe 49. The supplying unit 41 is rotatably centered on the pipe 49. In other words, the pipe 49 becomes a shaft centering the supplying unit 41 on which the supplying unit 41 rotates.

In addition, a plurality of supplying holes 42 are formed in the supplying unit 41 through which the high-temperature cleaning water flows out. In the present embodiment, the supplying holes 42 are formed at the supplying unit 41 such that the supplying holes 42 have a predetermined angle from an imaginary line that is perpendicular from an outer circumferential surface of the supplying unit 41.

In the present embodiment, the supplying holes 42 are horizontally positioned with respect to each other with the supplying holes 42 facing opposite directions. In this position the force of the high-temperature cleaning water flowing out of the supplying holes 42 propels the supplying unit 41 to rotate with the pipe 49 as the central axis.

Referring to FIG. 4 again, the sump 43 serves to receive the cleaning water that is supplied to the inside of the cooking chamber 11 to clean an inner wall of the cooking chamber 11. In the present embodiment, the sump 43 is positioned at a position that is lower than a position of a central portion of a bottom surface of the cooking chamber 11 and below the water gathering hole 13A. However, the position of the sump 43 is not limited thereto. In other words, the position of the sump 43 may be different according to the position of the water gathering hole 13A.

The filtering unit 45 is positioned between the water gathering hole 13A and the sump 43. The filtering unit 45 serves to filter foreign material, which may be food residuals, included in the cleaning water gathered at the water gathering hole 13A. For example, a wire net of a predetermined configuration and size, etc., may be used as the filtering unit 45. Therefore, the cleaning water from which foreign material is substantially removed may gather in the sump 43.

Meanwhile, a heating source serves to heat the cleaning water gathered in the sump 43. For example, as the heating source, a heater 47 that is installed adjacent to the sump 43 may be used. However, heaters having any shapes and positioned in any part of the cooker may be used as the heating source if they can heat the cleaning water gathered by the sump 43. For example, the heating source may be installed at the pipe 49.

The pump 48 serves to transfer the cleaning water gathered in the sump 43 to the supplying unit 41. In other words, high-temperature cleaning water gathered in the sump 43 and heated to a high temperature is transferred to the supplying unit 41 by the pump 48 to be supplied to the inside of the cooking chamber 11 by the supplying unit 41.

The pipes 49 serve to transfer to the supplying unit 41 the high-temperature cleaning water gathered by the sump 43 and then heated by the heater 47.

Hereinafter, operations of the third embodiment of the cooker according to the present invention will be described in more detail.

If a control unit operates the cleaning apparatus in order to remove the food residuals stuck to an inner surface of the cooking chamber 11, first, the pump 48 transfers the cleaning water gathered in the sump 43 to the supplying unit 41. At this time, the cleaning water transferred to the supplying unit 41 by the pump 48 is transferred to the heating source 48 where the cleaning water is heated. Therefore, high-temperature cleaning water flows out of the heating source 48 and through the pipe 49 towards the supplying unit 41.

Meanwhile, the high-temperature cleaning water transferred to the supplying unit 41 is supplied to the inside of the cooking chamber 11 through the supplying holes 42. The supplying unit 41 is rotatably installed at one end of the pipe, and the supplying holes 42 supply the high-temperature cleaning water at a predetermined angle against an imaginary line perpendicular to the outer circumference surface of the supplying unit 41. Therefore, if the high-temperature cleaning water is supplied to the inside of the cooking chamber 11 through the supplying holes 42, the supplying unit 41 rotates about the pipe 49 as the central axis.

As the supplying unit 41 is rotated about the pipe 49, the high-temperature cleaning water supplied from the supplying holes 42 can be evenly sprayed on the food residuals stuck to an inner surface of the cooking chamber 11. Therefore, the cleaning of the cooking chamber 11 can be performed more efficiently.

Hereinafter, a fourth embodiment of the cooker according to the present invention will be described in more detail with reference to the accompanying drawings.

Figure 6:
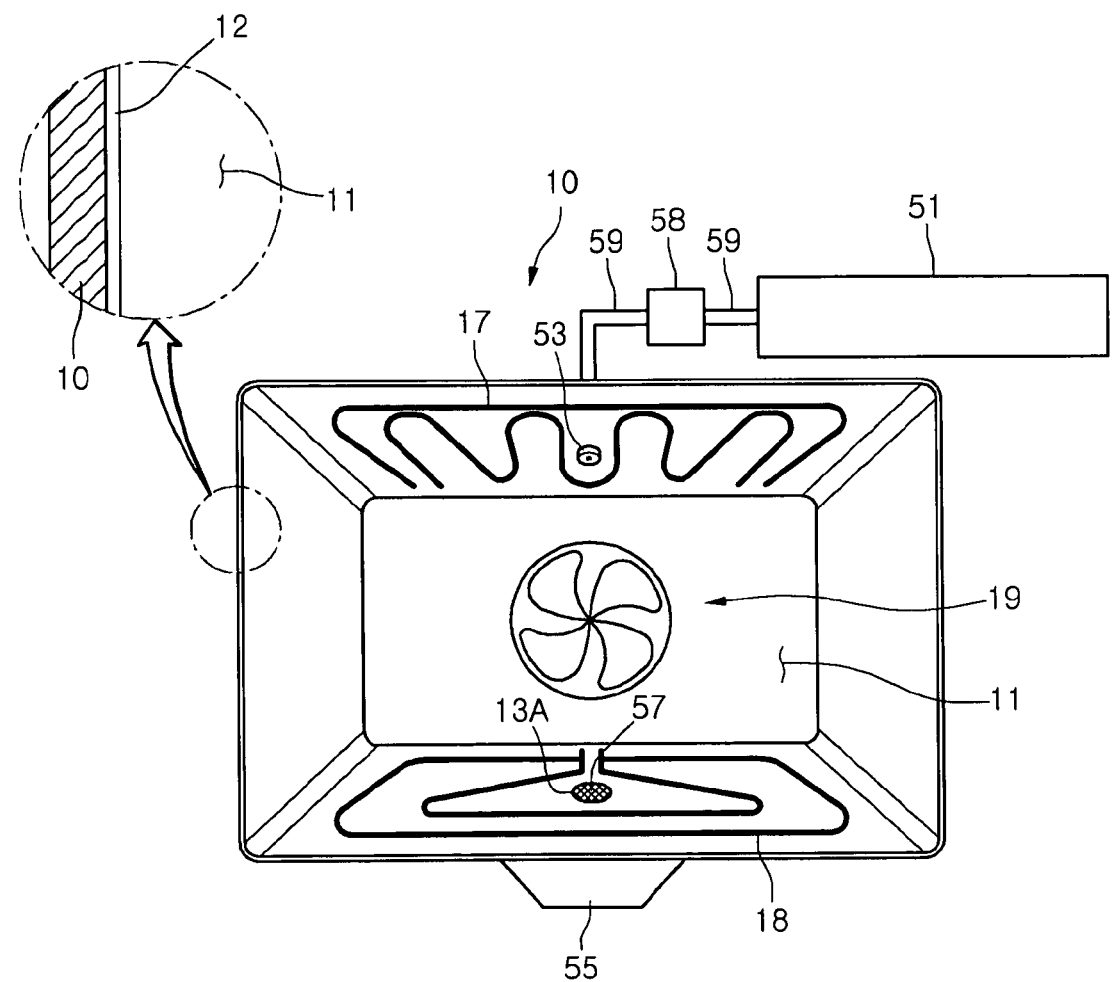
FIG. 6 is a schematic diagram of a fourth embodiment of the cooker according to the present invention.

FIG. 6 is a schematic diagram of a fourth embodiment of the cooker according to the present invention. The elements of the present embodiment that are the same or similar as those in the first embodiment will be described using the same reference numerals in FIGS. 1 and 2, and the detailed description thereof will be omitted.

Referring to FIG. 6, in the present embodiment, an enamel coating layer 12 including a phosphate-based ingredient, for example, a phosphate-based ingredient containing phosphorus pentoxide of 30% or less, preferably, phosphorus pentoxide of 20% or less, is provided on an inner surface of the cooking chamber 11. This may be considered to be the same or similar as that in the first embodiment.

In the present embodiment, the cleaning water supplied to the inside of the cooking chamber 11 is heated by a heating source that cooks food inside the cooking chamber 11. Also, the cleaning water supplied to the inside of the cooking chamber 11 is not circulated back to the cooking chamber 11 but is discharged to the outside. More specifically, to this end, in the present embodiment, a cleaning apparatus is configured to include a water tank 51, a supplying unit 53, a sump 55, a filter 57, a pump 58, and pipes 59.

The cleaning water is stored in the water tank 51. The supplying unit 53 serves to supply the cleaning water stored in the water tank 51 to the inside of the cooking chamber 11. The cleaning water that is supplied to the inside of the cooking chamber 11 from the supplying unit 53 to clean an inner wall of the cooking chamber 11 is gathered in the sump 55. The sump 55 is positioned at a position lower than a central portion of a bottom surface of the cooking chamber 11 corresponding to a position below a water gathering hole 13A formed on the bottom surface of the cooking chamber 11. The cleaning water gathered in the sump 55 is discharged to the outside, for example, through an operation that empties the sump 55 or through a pipe (not shown) connected to the sump 55, etc.

The pump 58 transfers the cleaning water stored in the water tank 51 to the inside of the cooking chamber 11 through the supplying unit 53.

The pipes 59 connect the water tank 51 to the supplying unit 53.

Hereinafter, operations of the fourth embodiment of the cooker according to the present invention will be described in more detail.

First, a control unit operates the cleaning apparatus in order to remove food residuals stuck to an inner surface of the cooking chamber 11. If the cleaning apparatus is operated, the pump 58 is driven. Therefore, the cleaning water stored in the water tank 51 flows through the pipe 59 driven by the pump 58, thereby being supplied to the inside of the cooking chamber 11 through the supplying unit 53.

If the cleaning water is supplied to the inside of the cooking chamber 11, the heating source, that is, at least one heating source which could be an upper heater 17, a lower heater 18, and a convection apparatus 19, is operated. Therefore, the cleaning water supplied to the inside of the cooking chamber 11 is heated by the operated heating source so that the food residuals stuck to the inner surface of the cooking chamber 11 is washed off or softened and then wiped, thereby allowing the cooking chamber 11 to be cleaned.

Meanwhile, the cleaning water that was used to clean the cooking chamber 11 gathers in the sump 55 through the water gathering hole 13A. The cleaning water gathered in the sump 55, that is, the cleaning water that was used to clean the cooking chamber is discharged to the outside through an operation that empties the sump 55 or through a pipe connected to the sump 55.

Hereinafter, a fifth embodiment of the cooker according to the present invention will be described in more detail with reference to the accompanying drawings.

Figure 7:
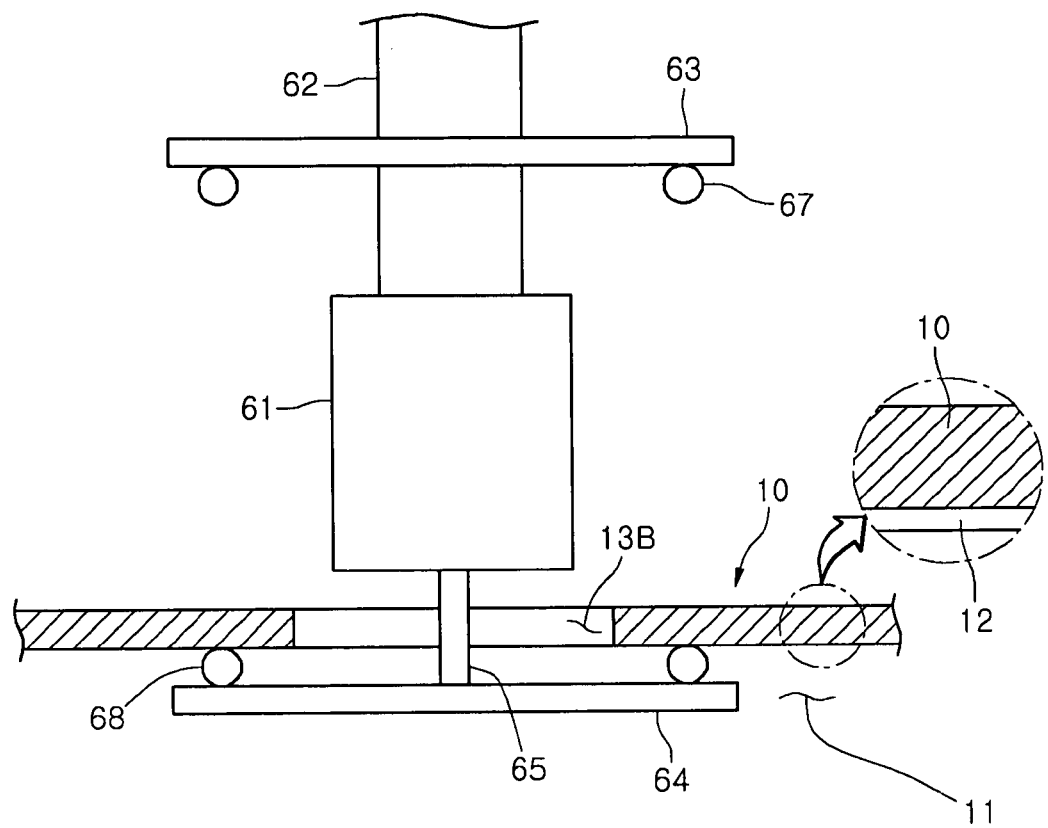
FIGS. 7 and 8 are vertical cross-sectional views showing principal parts of a fifth embodiment of the cooker according to the present invention.
Figure 8:
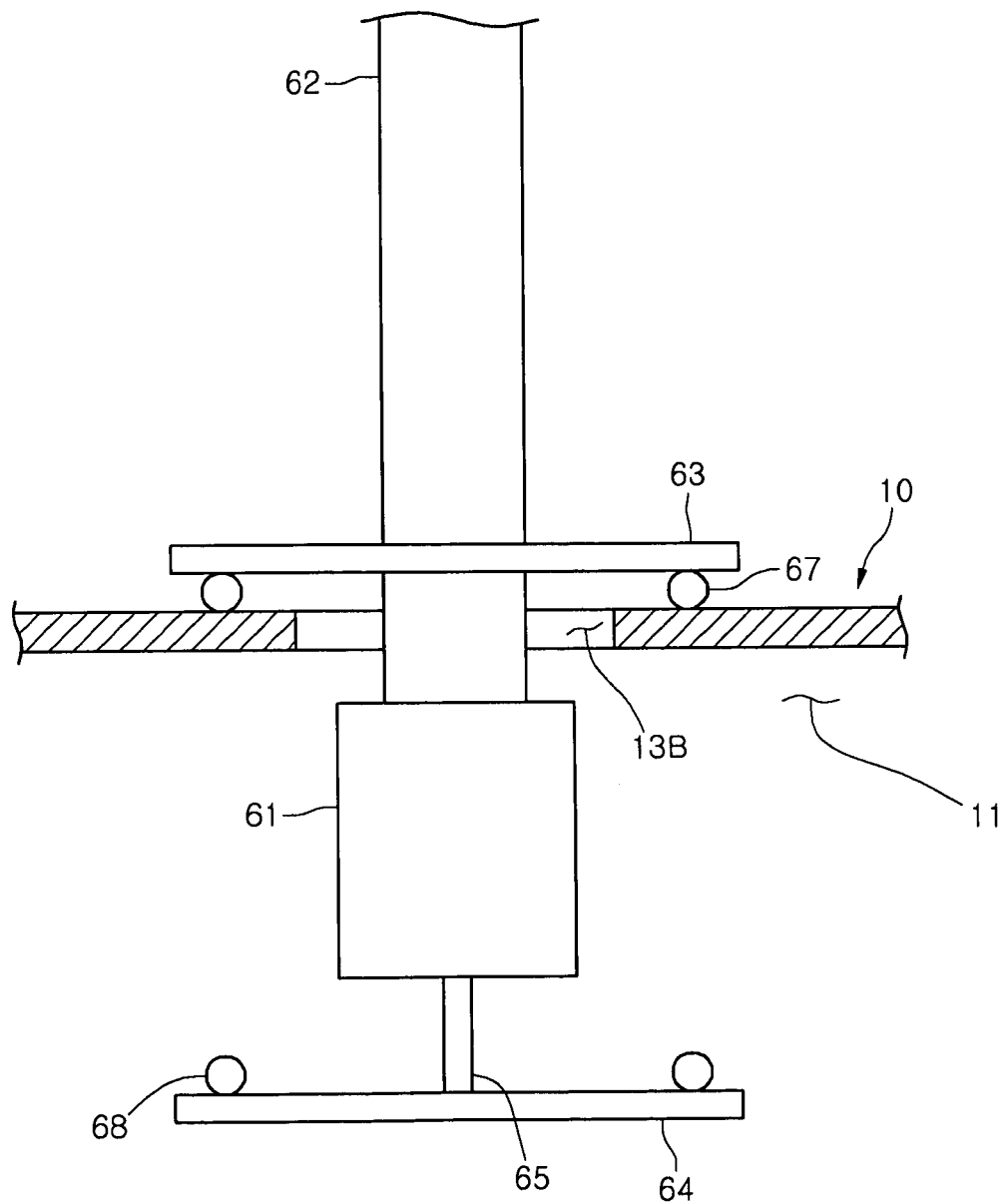

FIGS. 7 and 8 are vertical cross-sectional views showing parts of a fifth embodiment of the cooker according to the present invention. For the elements in the present embodiment that are the same or similar as those in the first embodiment, the detailed description thereof will be omitted.

Referring to FIGS. 7 and 8, a cooking chamber 11 where food is cooked is provided inside a cavity 10. An enamel coating layer 12 may be provided on an inner surface of the cooking chamber 11, in the same or similar manner as that in the first embodiment of the present invention.

A supplying unit 61 penetrates an opening part 13B which is formed by cutting a portion of a ceiling surface of the cooking chamber 11. Here, covers 63 and 64 should be formed with a size that is at least larger than that of a horizontal cross-section of a supplying unit 61 and will be described later.

The supplying unit 61 is installed to be selectively exposed to the inside of the cooking chamber 11. In other words, the supplying unit 61 can move to be exposed to the inside of the cooking chamber 11 or be positioned at an upper position that is outside of the cooking chamber 11. The supplying unit 61 is formed as a hollow cylindrical configuration of which a lower surface is shielded. The supplying unit 61 is rotatably installed centered at one end of a pipe 62 from which high-temperature cleaning water is expelled through a plurality of supplying holes (not shown) that are formed at the supplying unit 61. The supplying holes supply the high-temperature cleaning water in a direction that is a predetermined angle from an imaginary line that is perpendicular from an outer circumferential surface of the supplying unit 61. This may be considered to be similar to that in the first embodiment.

In addition, first and second covers 63 and 64 are installed above and below the supplying unit 61, respectively. The first cover 63 is positioned above the supplying unit 61 to cover the opening part 13B when the supplying unit 61 is exposed to the inside of the cooking chamber 11. The second cover 64 is positioned below the supplying unit 61 to cover the opening part 13B when the supplying unit 61 is positioned outside the cooking chamber 11.

In the present embodiment, the first and second covers 63 and 64 are spaced above or below the supplying unit 61 by a predetermined distance, respectively. To this end, the first cover 63 is fixed to the pipe 62 a predetermined distance above the upper surface of the supplying unit 61. The second cover 64 is fixed to an end of a fixing bar 65 that has a predetermined length from a lower surface of the supplying unit 61. In an alternative embodiment, the first and second covers 63 and 64 may be fixed to the upper and lower surfaces of the supplying unit 61, respectively.

Meanwhile, first and second sealing members 67 and 68 are provided at the lower and upper surfaces of the first cover 63 and the second cover 64, respectively. The first sealing member 67 serves to seal a gap between an outer upper surface of the cooking chamber 11 and the lower surface of the first cover 63. The second sealing member 68 serves to seal a gap between the ceiling surface of the cooking chamber 11 and the upper surface of the second cover 64. The first and second sealing members 67 and 68 are preferably molded of a heat-resistant material in order to withstand high temperature during the cooking of food inside the cooking chamber 1.

Although not shown, an elastic member, a driving member, and a driving force transferring member may be provided in order to selectively expose the supplying unit 61 to the inside of the cooking chamber 11. For example, the elastic member provides elasticity that pulls the supplying unit 61 out of the cooking chamber 11 to position itself outside of the cooking chamber 11. As the elastic member, a coil spring installed between the outer upper surface of the cooking chamber 11 and the lower surface of the first cover 63 may be used. The driving member provides driving force that allows the supplying unit 61 to be pushed into the cooking chamber 11, and thereby being exposed to the inside of the cooking chamber 11. The driving force transferring member transfers driving force of the driving member to the supplying unit 61. For example, as the driving member, a motor may be used, and as the driving force transferring member, a cam that transfers the driving force of the driving member to the first cover 63 may be used. Therefore, if the driving motor is driven, one side of the cam moves the first cover 63 downward so that the supplying unit 61 is exposed to the inside of the cooking chamber 11.

Hereinafter, operations of the fifth embodiment of the cooker according to the present invention will be described in more detail.

First, during a process that cooks food inside the cooking chamber 11, the supplying unit 61 is positioned outside the cooking chamber 11 by elasticity of the elastic member. The opening part 13B is shielded by the second cover 64, and a gap between a ceiling surface of the cooking chamber 11 where the opening part 13B is located and an upper surface of the second cover 64 is sealed by the second sealing member 68. Therefore, heated air leaking from the cooking chamber 11 through the opening part 13B during the process that cooks food in the cooking chamber 11 is prevented.

The supplying unit 61 is then exposed to the inside of the cooking chamber 11 through the opening part 13B in order to wash away or soften the food residuals stuck to the inner surface of the cooking chamber 11. More specifically, if a control unit drives the driving member, driving force of the driving member is transferred to the supplying unit 61 by the driving force transferring member. This allows the supplying unit 61 to overcome the elasticity of the elastic member, and thereby move downward to be exposed to the inside of the cooking chamber 11.

In the configuration similar to the third embodiment of the present invention, a pump 48 (see FIG. 4) transfers cleaning water gathered in a sump 43 (see FIG. 4) to the supplying unit 61. At the sump 43, a heating source 47 (see FIG. 4) heats the cleaning water to be transferred to the supplying unit 61.

The high-temperature cleaning water transferred to the supplying unit 61 that is exposed to the inside of the cooking chamber 11 is supplied to the inside of the cooking chamber 11 through the supplying holes. The supplying unit 61 is rotatably installed at one end of the pipe 62, and the supplying holes supply the high-temperature cleaning water in a direction that is a predetermined angle from an imaginary line that is perpendicular from an outer circumferential surface of the supplying unit 61. Therefore, if the high-temperature cleaning water is supplied to the inside of the cooking chamber 11 through the supplying holes, the supplying unit 61 rotates centered about the pipe 62 due to the propelling force of the high-temperature cleaning water.

The supplying unit 61 rotates centered about the pipe 62 as described above so that the high-temperature cleaning water that is supplied from the supplying holes can evenly clean the food residuals stuck to the cooking chamber 11. Therefore, the cleaning of the cooking chamber 11 is performed more efficiently.

At this time, the opening part 13B is shielded by the first cover 63. Also, the gap between the outer upper surface of the cooking chamber 11 where the opening part 13B is located and the first cover 63 is sealed by the first sealing member 67. Therefore, the high-temperature cleaning water supplied through the supplying holes leaking to the outside of the cooking chamber 11 through the opening part 13B is prevented.

In addition, if the washing of the food residuals stuck to the inner surface of the cooking chamber 11 by the supplying unit 61 is completed, the driving force of the driving member provided in the supplying unit 61 is stopped. Therefore, the supplying unit 61 moves out of the cooking chamber 11 due to the elasticity of the elastic member as described above.

Hereinafter, a sixth embodiment of the cooker according to the present invention will be described in more detail with reference to the accompanying drawings.

Figure 9:
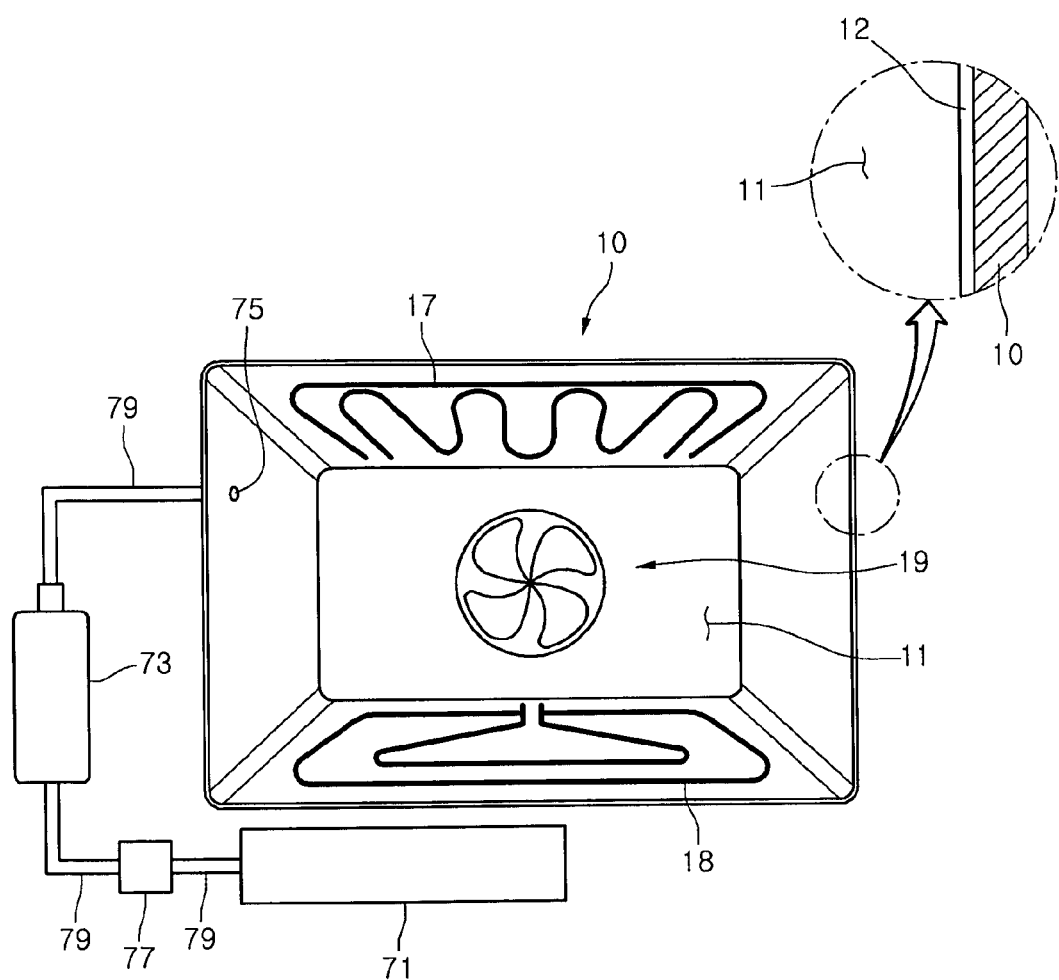
FIG. 9 is a schematic diagram of a sixth embodiment of the cooker according to the present invention.

FIG. 9 is a schematic diagram of a sixth embodiment of the cooker according to the present invention. The elements of the present embodiment that are the same or similar as those in the first embodiment will be described using the same reference numerals in FIGS. 1 and 2, and the detailed description thereof will be omitted.

Referring to FIG. 9 in the present embodiment, an enamel coating layer 12 including a phosphate-based ingredient, for example, a phosphate-based ingredient containing phosphorus pentoxide of 30% or less, preferably, phosphorus pentoxide of 20% or less, is provided on an inner surface of a cooking chamber 11. This may be considered to be the same or similar as that in the first embodiment.

In the present embodiment, steam is supplied to the inside of the cooking chamber 11, and the cleaning of the cooking chamber 11 is made by the supplied steam. Of course, the steam supplied to the inside of the cooking chamber 11 may also be used for cooking food inside the cooking chamber 11, besides cleaning the cooking chamber 11.

In the present embodiment, a steam generating apparatus that generates steam supplied to the inside of the cooking chamber 11 is provided. The steam generating apparatus is configured to include a water tank 71, a steam generating unit 73, a supplying unit 75, a pump 77, and pipes 79.

Water is stored in the water tank 71. The water tank 71 may be detachably installed in order to replenish water in the water tank 71. In alternative embodiments, the water tank 71 may receive water directly from an external water source or may receive water from a separate container containing water.

The steam generating unit 73 serves to generate steam by receiving and heating water from the water tank 71. To this end, the steam generating unit 73 may be similar to the heating unit 23 in the first embodiment of the present invention. However, although the heating unit 23 heats to increase the temperature of the cleaning water, the steam generating unit 73 heats to convert water into steam.

The supplying unit 75 supplies the steam generated by the steam generating unit 73 to the inside of the cooking chamber 11.

The pump 77 serves to transfer the water stored in the water tank 71 to the steam generating unit 73.

Pipes 79 connect the water tank 71 to the steam generating unit 73, and connect the steam generating unit 73 to the supplying unit 75.

Hereinafter, operations of the sixth embodiment of the cooker according to the present invention will be described in more detail.

First, if a control unit operates the steam generating apparatus, the pump 77 is driven. Therefore, water stored in the water tank 71 flows through the pipes 79 driven by the pump 77, thereby being supplied to the steam generating unit 73.

The steam generating unit 73 heats the water supplied from the water tank 71 to generate steam. The steam generated from the steam generating unit 73 flows through the pipe 79 to be supplied to the inside of the cooking chamber 11 through the supplying unit 75.

Meanwhile, the steam supplied to the inside of the cooking chamber 11 may also be used in cleaning the cooking chamber 11 or in cooking the food inside the cooking chamber 11. When the steam supplied to the inside of the cooking chamber 11 is used in cleaning the cooking chamber 11, the steam supplied to the inside of the cooking chamber 11 tempers with the food residuals stuck to the inner surface of the cooking chamber 11. A user wipes away the food residuals tempered by the steam supplied to the inside of the cooking chamber 11, thereby cleaning the cooking chamber 11.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

In the embodiments as described above, although only the upper heater, the lower heater, and the convection apparatus are described as the heating sources that cook food inside the cooking chamber, other heating sources may also be provided. For example, a high frequency heating source that supplies microwaves to the inside of the cooking chamber, such as a magnetron, may also be provided.

In the second embodiment as described above, the output unit outputs the signal that reports the elapse of the operation time and the elapse of the tempering time. However, in other embodiments of the present invention, the output unit may also output a signal that reports the elapse of the operation time of the heating source or the steam generating apparatus and/or the elapse of the tempering time after the operation time elapses.

With the cooker in accordance with embodiments of the present invention, the following effects can be expected.

First, the inner surface of the cooking chamber is coated with enamel including phosphorus pentoxide ($P_2O_5$). Therefore, during the process in which food is cooked inside the cooking chamber, the cleaning of the cooking chamber that is polluted by the food residuals, etc. can be easily performed.

In addition, the inside of the cooking chamber can be cleaned using the high-temperature cleaning water generated from the cleaning apparatus. Therefore, the inside of the cooking chamber can be kept more clean.

What is claimed is:

1. A cooker, comprising:
    a cavity including a cooking chamber, the cavity having an opening;
    a door that selectively opens and closes the cooking chamber;
    a first heating source that provides heat for cooking food inside the cooking chamber;
    an enamel coating layer positioned on an inner surface of the cooking chamber and including a phosphorus pentoxide ($P_2O_5$) ingredient;
    a cleaning apparatus that supplies cleaning water to an inside of the cooking chamber;
    a control unit that controls operations of the heating sources and the cleaning apparatus; and
    a second heating source configured to heat the cleaning water supplied to the inside of the cooking chamber,
    wherein the cleaning apparatus comprises:
        a water tank that stores cleaning water; and
        a supplying unit that supplies the cleaning water to the inside of the cooking chamber, the supplying unit being movable through the opening of the cavity;
        a conduit coupled to the supplying unit to guide the cleaning water from the water tank to the supplying unit;
        a first cover disposed within the cooking chamber to shield the opening when the supplying unit is positioned at an outside of the cooking chamber; and
        a second cover disposed at the outside of the cooking chamber to shield the opening when the supplying unit is positioned within the cooking chamber.

2. The cooker according to claim 1, wherein the second heating source is the first heating source.

3. The cooker according to claim 1, wherein the cleaning apparatus further includes a sump that gathers the cleaning water supplied to the inside of the cooking chamber.

4. The cooker according to claim 3, wherein the cleaning water gathered in the sump is recirculated to the inside of the cooking chamber by the cleaning apparatus or is discharged to the outside thereof.

5. The cooker according to claim 3, further comprising:
    an output unit that outputs a reporting signal when the operation of the cleaning apparatus for cleaning the inside of the cooking chamber is finished.

6. The cooker according to claim 3, further comprising:
    an output unit that outputs a reporting signal when a predetermined time elapses after finishing of the operation of the cleaning apparatus for cleaning the inside of the cooking chamber.

7. The cooker according to claim 3, wherein the supplying unit is selectively exposed to the inside of the cooking chamber.

8. The cooker according to claim 3, wherein the supplying unit is rotated while supplying the cleaning water to the inside of the cooking chamber.

9. The cooker according to claim 8, wherein the supplying unit is rotated by propulsion of the cleaning water flowing out of the supplying unit.

10. The cooker according to claim 1, further comprising:
    a first sealer provided at the first cover to contact the cavity; and
    a second sealer provided at the second cover to contact the cavity.

* * * * *